(12) United States Patent
Abe

(10) Patent No.: US 6,226,445 B1
(45) Date of Patent: *May 1, 2001

(54) IMAGE COMPRESSION AND EXPANSION DEVICE

(75) Inventor: Nobuaki Abe, Hokkaido (JP)

(73) Assignee: Asahi Kogaku Kogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/919,333

(22) Filed: Aug. 28, 1997

(30) Foreign Application Priority Data

Aug. 29, 1996 (JP) .................................................. 8-247255

(51) Int. Cl.[7] ..................................................... H04N 5/91
(52) U.S. Cl. ............................. 386/94; 386/111; 348/405
(58) Field of Search ................................. 386/33, 94, 109, 386/111, 112, 125–126; 348/398, 405, 417, 418, 422, 578; 360/8, 60; 380/5; 375/240.02, 240.03, 240.04, 240.05, 240.06, 240.07, 245

(56) References Cited

U.S. PATENT DOCUMENTS 5,068,744 * 11/1991 Ito ............................................ 386/33
5,497,246    3/1996 Abe .
5,666,209    9/1997 Abe .
5,802,210 *  9/1998 Kurata et al. ........................ 348/578

FOREIGN PATENT DOCUMENTS 7135568    11/1994 (JP) .

* cited by examiner

Primary Examiner—Wendy Garber
Assistant Examiner—Christopher Onuaku
(74) Attorney, Agent, or Firm—Greenblum & Bernstein, P.L.C.

(57) ABSTRACT

The image compression and expansion device comprises: a DCT processing unit in which original image data is subjected to a two-dimensional discrete cosine transformation to obtain DCT coefficients; a quantization process unit in which the DCT coefficients are quantized by a normal mode quantization table to obtain quantized DCt coefficients; and a compression processing unit in which the quantized DCT coefficients are encoded to generate compressed image data. The compressed image data is recorded in a compressed image data recording area. A security mode quantization table is recorded in a first table recording area which is accessed in a usual expansion process. A normal mode quantiation table is recorded in a second table recording area which is not accessed in the normal expansion mode.

12 Claims, 8 Drawing Sheets

FIG. 2A

SECURITY MODE QUANTIZATION TABLE Qsy $$\begin{pmatrix} 16 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \end{pmatrix} \sim QT1$$

FIG. 2B

NORMAL MODE QUANTIZATION TABLE Qy $$\begin{pmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{pmatrix} \sim QT2$$

IMAGE COMPRESSION AND EXPANSION DEVICE

BACKGROUND OF THE INVENTION

1. Field of the Invention

The present invention is related to a device which compresses still image data in accordance with a JPEG (Joint Photographic Expert Group) algorithm and records the compressed image data in a recording medium and, also, to a device which reads the compressed image data from the recording medium and expands the compressed image data to reproduce the still image.

2. Description of the Related Art

A standard algorithm, for the encoding of high resolution images and the transfer of that information through telecommunication transmission channels, has been recommended by the JPEG. In order to enable a large-scale data compression, the baseline process of the JPEG algorithm breaks down the original image data into components on a spatial frequency axis using a two-dimensional DCT process. Thereafter, the data expressed on the spatial frequency axis is quantized by using a quantization table. The quantized data is then encoded using a Huffman table.

The encoded (or compressed) image data can be expanded by carrying out a process, which is the inverse of the compression process described above, so that the original image data can be reproduced. Namely, the compressed image data is decoded, subjected to a dequantization process, using a quantization table, and finally, subjected to a two dimensional inverse discrete transformation, so that the original image data is reproduced.

At the moment, however, even if there is a copyright on the original image, for example, the compressed image data of the original image, which is recorded in the recording medium, is still, fully, reproduced if an image expansion is carried out using a conventional image expansion device.

SUMMARY OF THE INVENTION

Accordingly, an object of the present invention is to provide an image compression device which can compress and record, in a recording medium, the original image data, so that, when the original image should not be reproduced in a coherent form from the compressed image data recorded in the recording medium, an image having a lower quality than the original image is recreated.

According to the present invention, there is provided an image compression device, by which compressed image data is recorded in a recording medium, having a compressed image data recording area, in which said compressed image data is stored, and a first table recording area, which is accessed in a usual expansion process. The image compression device comprises a two-dimensional discrete cosine transformation (two-dimensional DCT) processor, a quantization processor, an encoding processor, a compressed image recording processor and a first table recording processor.

The two-dimensional DCT processor processes original image data to obtain a DCT coefficient for each spatial frequency. The quantization processor quantizes the DCT coefficients by a normal mode quantization table, which is used in the usual expansion process, to obtain quantized DCT coefficients. The encoding processor encodes the quantized DCT coefficients to obtain compressed image data. The compressed image recording processor records the compressed image data in the compressed image data recording area. The first table recording processor records a security mode quantization table, which is used in a security mode for reproducing an image having a lower quality than the original image, in the first table recording area.

Another object of the present invention is to provide an image expansion device which can cancel the security mode, in which an image having a lower quality than the original image is reproduced from the compressed image data recorded by the image compression device, so that an image having a normal quality is reproduced.

According to the present invention, there is provided an image expansion device which reads and expands compressed image data from a recording medium, the recording medium having a first table recording area, in which a security mode quantization table, which is used in a security mode for reproducing an image having a lower quality than the original image, is stored, a second table recording area, in which a normal mode quantization table, which is used in a usual expansion process, is stored and an information recording area, in which security information is stored. The device comprises a decoding processor, a table selecting processor, a dequantization processor and a two dimensional inverse discrete cosine transformation (two-dimensional IDCT) processor.

The decoding processor decodes the compressed image data to obtain quantized DCT coefficients. The table selecting processor selects the security mode quantization table from the security mode quantization table and the normal mode quantization table, if a password, corresponding to the security information, is not inputted to the image expansion device. The dequantization processor dequantizes the quantized DCT coefficients, using the quantization tables selected by the table selecting processor, to obtain DCT coefficients. The two-dimensional IDCT processor processes the DCT coefficients to reproduce original image data corresponding to the compressed image data.

BRIEF DESCRIPTION OF THE DRAWINGS

The present invention will be better understood from the description of the preferred embodiments of the invention set forth below, together with the accompanying drawings, in which:

FIG. 2A is a view showing a security mode quantization table;

FIG. 2B is a view showing a normal mode quantization table;

DESCRIPTION OF THE PREFERRED EMBODIMENTS

Figure 1:
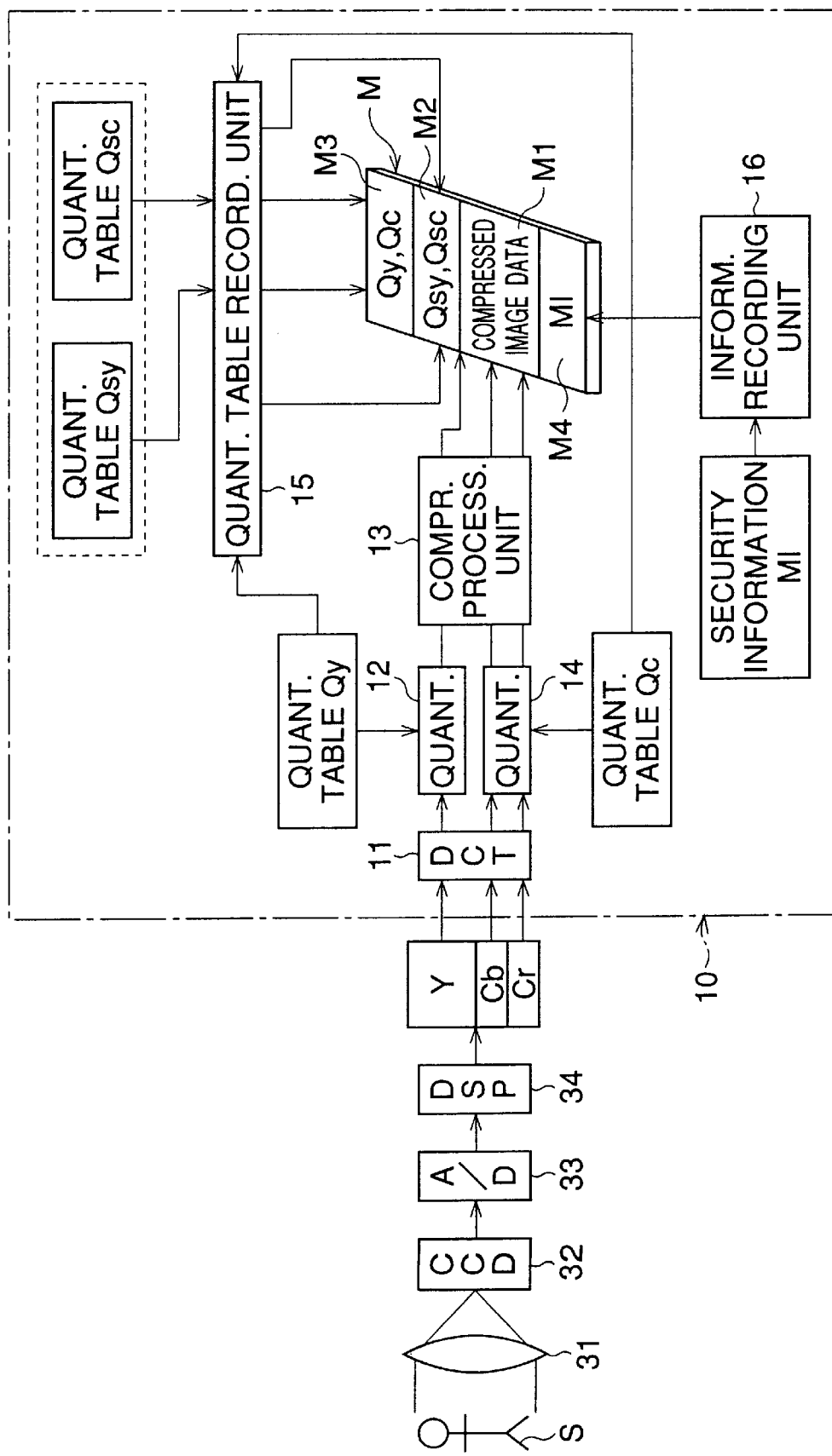
FIG. 1 is a block diagram showing an image compression device of an embodiment of the present invention.

The present invention will be described below with reference to embodiments shown in the drawings.

FIG. 1 is a block diagram of an image compression device of an embodiment of the present invention, by which luminance signals (Y data) and color difference signals (Cb data and Cr data), which correspond to an original still image, are compressed according to the JPEG algorithm.

Light reflected from a subject S passes through an imaging optical system 31 such that the reflected light is focused on a CCD (charge coupled device) 32 on which red, green and blue color filter elements (not shown) are provided. The CCD 32 produces charges, which are representative of the quantity of light incident thereon, and outputs an analog signal to an A/D converter 33.

The A/D converter 33 converts the analog signal to a digital image signal which is inputted to a signal processing unit 34. The signal processing unit 34 converts the color image signal into Y data, Cb data and Cr data, which are inputted to the image processing device 10 to be compressed into JPEG data. In accordance with the present invention, the signal processing unit 34 may be, for example, a conventional digital signal processor (DSP) programmed to convert the image data as described above.

The Y data is subjected to a two-dimensional discrete cosine transformation (two-dimensional DCT), in a DCT processing unit 11, so as to produce a DCT coefficient for each spatial frequency. The DCT coefficients of the Y data are inputted to a first quantization processing unit 12, in which the DCT coefficients are quantized using a Y-data quantization table Qy, so that quantized DCT coefficients are obtained. The quantized DCT coefficients of the Y data are converted to compressed image data by being Huffman-encoded (or compressed), in a compression processing unit 13, in accordance with the JPEG algorithm. The compressed image data are then recorded in an image recording area M1 of a recording medium M.

In the same way as the above, the Cb data and the Cr data are converted to DCT coefficients, in the DCT processing unit 11, and are then quantized in a second quantization processing unit 14, using a C-data quantization table Qc, to produce quantized DCT coefficients. The quantized DCT coefficients of the Cb and Cr data are converted to compressed image data by being Huffman-encoded (or compressed), in the compression processing unit 13, in accordance with the JPEG algorithm. The compressed image data are then recorded in the image recording area M1.

Besides the image recording area M1, the recording medium M has a first table recording area M2 which is accessed in a usual expansion process, a second table recording area M3 which is not accessed in the usual expansion process, and an information recording area M4 for storing security information MI.

The Y-data quantization table Qy and the C-data quantization table Qc, used in the first and second quantization units 12 and 14, respectively, are normal mode quantization tables, which are used in the usual expansion process, and which are composed of respective predetermined quantization coefficients which are recommended by the JPEG. Therefore, when the expansion process is carried out, using the quantization tables Qy and Qc, an image is reproduced, which is as close to the original image as possible. The quantization tables Qy and Qc are converted to data, which conform to a predetermined format in a quantization table recording unit 15, and are recorded in a second table recording area M3 of the recording medium M. Namely, the normal mode quantization tables Qy and Qc can not be accessed in the usual expansion process, but are only accessed when a selection process is performed as described later.

In the first table recording area M2 of the recording medium M, security mode quantization tables Qsy and Qsc are recorded. The quantization tables Qsy and Qsc are converted, in the quantization table recording unit 15, to data, which conform to a predetermined format, and are then recorded in the first table recording area M2. The quantization tables Qsy and Qsc comprise of quantization coefficients for expanding the compressed image data as a mosaic-processed image, for example.

In an information recording area M4 of the recording medium M, security information MI, implying that the security quantization tables Qsy and Qcy are recorded in the first table recording area M2 and the normal mode quantization tables Qy and Qc are recorded in the second table recording area M3, is recorded. Namely, the security information MI implies that, either, a mosaic-process image, or an image, which is as close to the original image as possible, can be reproduced from the compressed image data. The security information MI is converted, in an information recording unit 16, to data which conforms to a predetermined format. The data are then recorded in the information recording area M4.

FIGS. 2A and 2B show an example of two types of quantization table which can be used for quantizing or dequantizing the luminance data Y. Reference QT1 shows the security mode quantization table Qsy. Reference QT2 shows the normal mode quantization table Qy, which is used for cancelling the security mode as described later.

The two-dimensional DCT performed in the DCT processing unit 11 and the quantization performed in the quantization processing units 12 and 14 are described below.

The luminance data Y and the color difference data Cb and Cr, regarding a single frame image, are divided into a plurality of blocks which are processed separately. Note that each of the blocks is composed of pixel data arranged in an 8×8 matrix.

Figure 3:
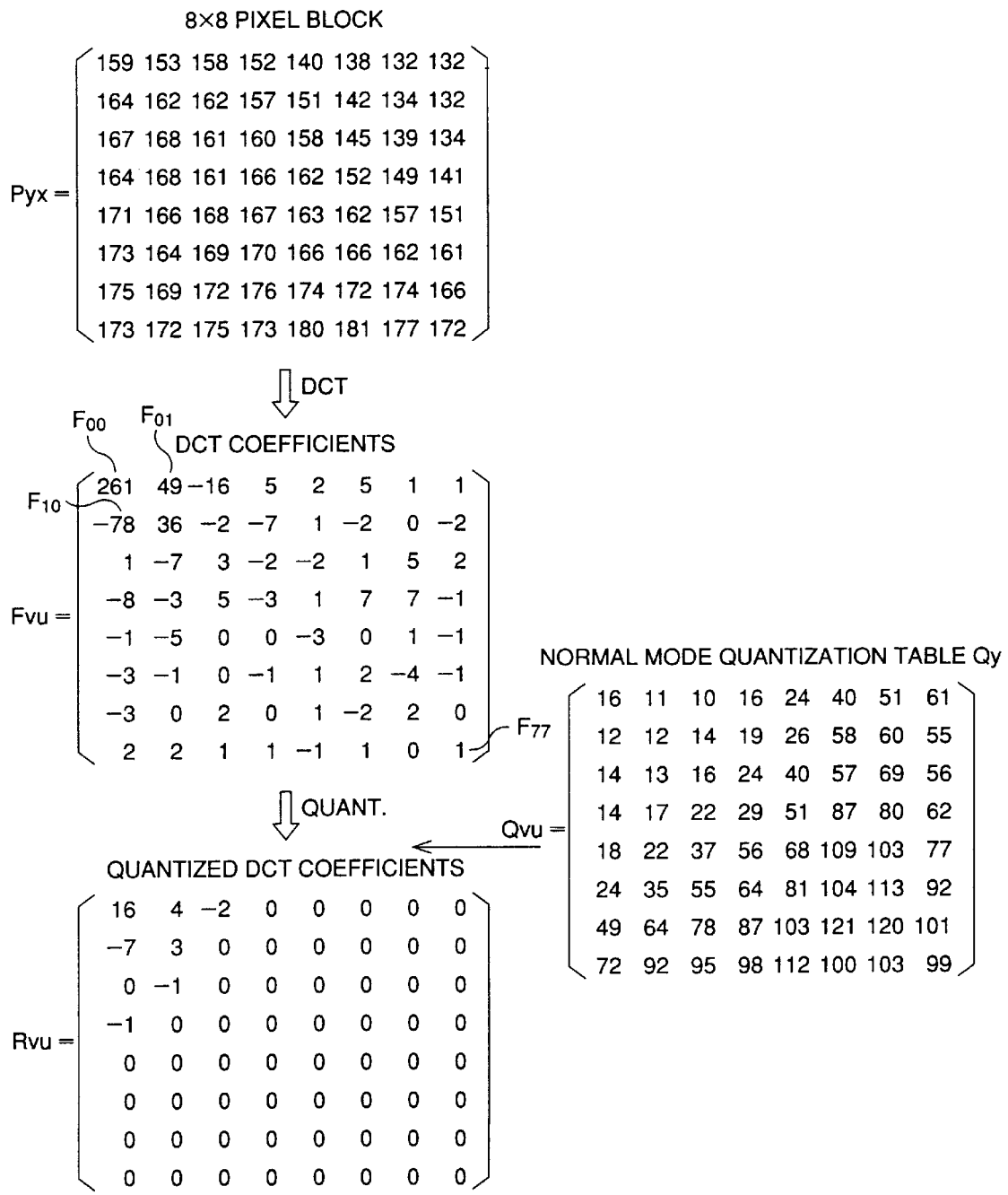
FIG. 3 is a view showing an example of image data Pyx, DCT coefficients Fvu, quantized DCT coefficients Rvu and a quantization table Qvu.

FIG. 3 shows, as an example, pixel values Pyx of an 8×8 pixel block, DCT coefficients Fvu, quantized DCT coefficients Rvu and the normal mode quantization table Qy. Suffix "y" indicates a vertical position in the 8×8 pixel block. Values of "y" (0, 1, 2, ... 7) ascend from an upper-position to a lower-position. Suffix x indicates a the horizontal position in the 8×8 pixel block. Values of "x" (0, 1, 2, ... 7) ascend from a left-position to a right-position. The Suffixes "v" and "u" correspond to vertical and horizontal positions of 64 DCT coefficients which are arranged in an 8×8 matrix. Values of "v" (0, 1, 2, ... 7) ascend from the upper-position to the lower-position. Values of "u" (0, 1, 2, ... 7) ascend from the left-position to the right-position.

The pixel values Pyx are converted to 64 (8×8) DCT coefficients Fvu by the two-dimensional DCT. The two-dimensional DCT is expressed by the following equation (1):

$$Fvu = \frac{1}{4} Cu\, Cv \sum_{y=0}^{7} \sum_{x=0}^{7} Pyx \cdot \cos\frac{(2x+1)u\pi}{16} \cdot \cos\frac{(2y+1)v\pi}{16} \quad (1)$$

wherein $$Cu,\, Cv = \frac{1}{\sqrt{2}} : u,\, v = 0$$
$$= 1 : u,\, v \neq 0$$

Of these DCT coefficients, a DCT coefficient $F_{00}$ at a position (0,0) is a DC (Direct Current) component, while the remaining 63 DCT coefficients Fvu are AC (Alternating Current) components. The AC components show how many higher spatial frequency components there are in the 8×8 pixel block of image data from the coefficients $F_{01}$ and $F_{10}$ to the coefficient $F_{77}$. The DC component shows the average value of the spatial frequency components of the 8×8 pixel block as a whole. Each DCT coefficient Fvu corresponds to a predetermined spatial frequency.

The quantization table Qy comprises of 64 quantization coefficients Qvu. The equation for quantization of the DCT coefficients Fvu, using the quantization table Q1, is defined as follows:

$$Rvu = \text{round}(Fvu/Qvu)\,(0 \leq u,v \leq 7)$$

The term "round", in this equation, is an approximation function which approximates, to the nearest integer, the value of the argument. Thus, if the argument is less than 0.5, the value is rounded down to the nearest integer. If the argument is greater than or equal to 0.5, the value is rounded up to the nearest integer. For example, the value 3.49 is rounded down to 3, whereas 3.50 is rounded up to 4. Namely, the quantized DCT coefficients Rvu, shown in FIG. 3, are obtained by dividing each of the DCT coefficients Fvu by the corresponding quantization coefficients Qvu, and rounding off.

In this way, the quantized DCT coefficients Rvu, obtained in the quantization processing unit 12, are inputted to the compression processing unit 13. Since the Huffman encoding, performed in the compression processing unit 13, is well known, a detailed explanation thereof is omitted in this specification.

Figure 4:
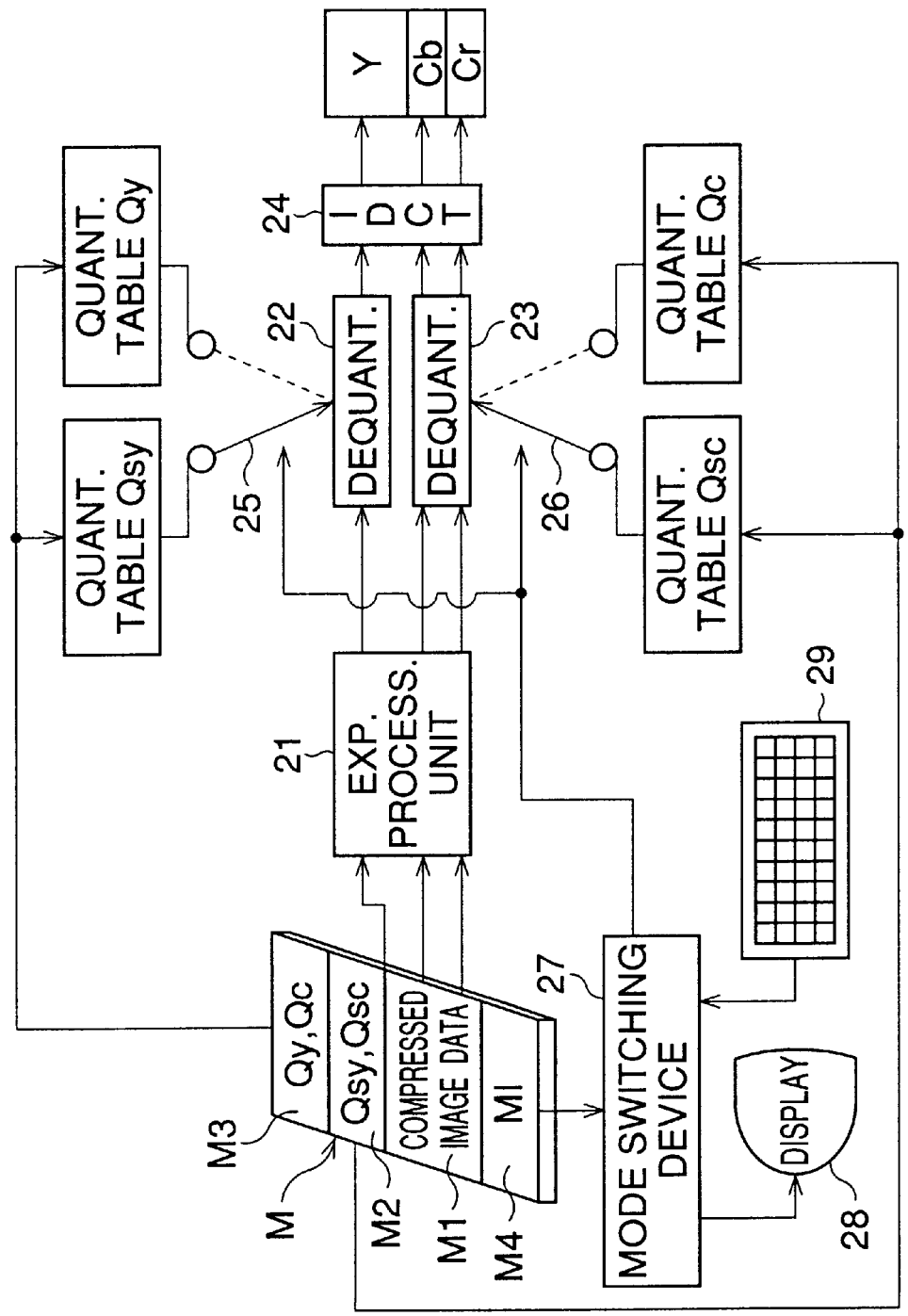
FIG. 4 is a block diagram showing an image expansion device of the embodiment.

FIG. 4 is a block diagram of an image expansion device of the embodiment of the present invention.

The compressed image data, corresponding to the Y data, the Cb data and the Cr data, read from the recording medium M are decoded, in an expansion processing unit 21, and converted to the quantized DCT coefficients. The decoding is an inverse of the Huffman encoding, which is well known. The quantized DCT coefficients, obtained by the decoding, are dequantized, in a dequantization processing unit 22 for the luminance signal or a dequantization processing unit 23 for the color difference signal, using the quantization tables Qy and Qc (or Qsy and Qsc), respectively, so that the quantized DCT coefficients are converted back to the DCT coefficients. These DCT coefficients are then subjected to a two-dimensional IDCT, in an IDCT processing unit 24, so that the luminance data Y and the color difference data Cb and Cr are reproduced.

The security mode quantization tables Qsy and Qsc and the normal mode quantization tables Qy and Qc are stored, respectively, in the first table recording area M2 and in the second table recording area M3, of the recording medium M. The security mode quantization tables Qsy and Qsc or the normal mode quantization tables Qy and Qc are used in the dequantization processing units 22 and 23 in accordance with the operation of switches 25 and 26.

The quantization tables Qy and Qsy, for the luminance data, are inputted into the dequantization processing unit 22 through switch 25. The quantization tables Qc and Qsc, for the color difference data, are inputted into the dequantization processing unit 23 through switch 26. The switches 25 and 26 are operated in accordance with a switch command signal outputted by a mode switching device 27. A display device 28 and a keyboard 29 are connected to the mode switching device 27. Based on the security information MI, read from the information recording area M4 of the recording medium M, an indication, implying that the security mode quantization tables Qsy and Qsc and the normal mode quantization tables Qy and Qc can be selected, is registered on the display device 28. By operating the keyboard 29 in accordance with the indication, switches 25 and 26 are operated.

Usually, switches 25 and 26 are set in the positions shown by the solid lines in FIG. 4, such that the security mode quantization tables Qsy and Qsc are selected. For setting the switches 25 and 26 to the positions shown by the broken lines, so that the normal mode quantization tables Qy and Qc are selected, a password corresponding to the security information MI recorded in the information recording area M4 should be inputted at the keyboard 29. Namely, in the mode switching device 27, it is determined whether the data, inputted via the keyboard 29, is the password corresponding to security information MI. When the password data is correct, a switching command signal is transmitted to each of the switches 25 and 26, so that switches 25 and 26 are set to the positions which enable the normal mode quantization tables Qy and Qc to be inputted to the dequantization processing circuits 22 and 23.

When switches 25 and 26 are set to the positions shown by the solid lines in FIG. 4, the dequantization processes are performed using the security mode quantization tables Qsy and Qsc in the dequantization processing units 22 and 23. Thus, a mosaic-processed image is reproduced. Conversely, when the switches 25 and 26 are set to the positions shown by the broken lines in FIG. 4, the dequantization processes are performed using the normal mode quantization tables Qy and Qc in the dequantization processing units 22 and 23. Quantization coefficients forming the quantization tables Qy and Qc have values larger than "1", in the example shown in FIG. 2. Therefore, an image, which is as close to the original image as possible, can be reproduced, by carrying out an expansion process using the quantization tables Qy and Qc. Namely, the normal mode quantization tables Qy and Qc are used for cancelling the security mode.

Note that, when the data inputted via the keyboard 29 does not conformed to the password, switches 25 and 26 are kept in a condition in which the security mode quantization tables Qsy and Qsc can be inputted to the dequantization processing units 22 and 23. Further, a message, implying that the security mode cannot be cancelled, is indicated by the display device 28.

Figure 5:
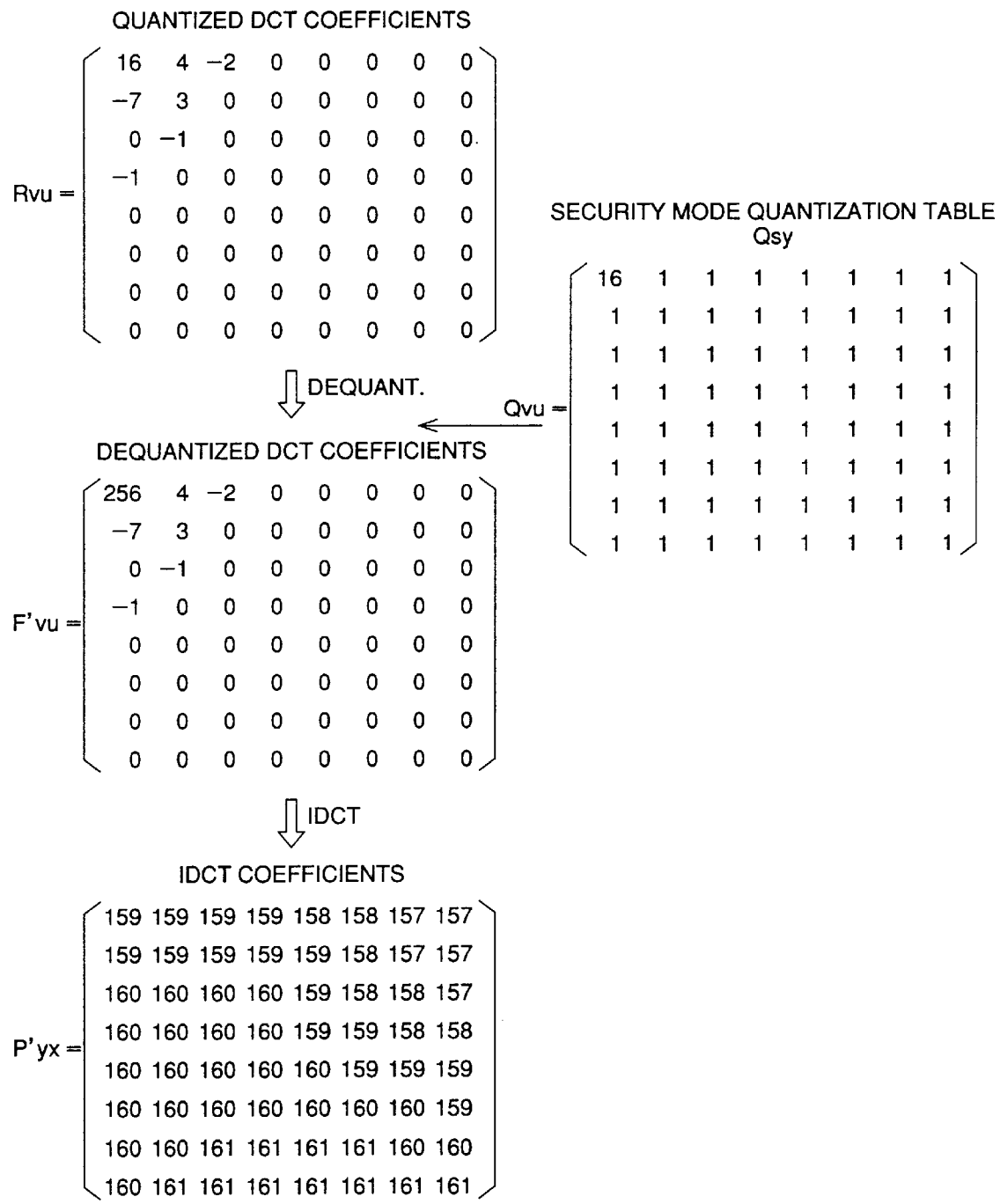
FIG. 5 is a view showing an example of quantized DCT coefficients Rvu obtained by an expansion processing unit, dequantized DCT coefficients F'vu obtained by a dequantization processing unit and IDCT coefficients P'yx obtained by an IDCT processing unit.

FIG. 5 shows an example of quantized DCT coefficients Rvu obtained by the expansion processing unit 21, dequantized DCT coefficients F'vu obtained by the dequantization processing unit 22 and IDCT coefficients P'yx obtained by the IDCT processing unit 24. This example shows the quantized DCT coefficients Rvu being dequantized using the security mode quantization table Qsy.

Namely, the quantized DCT coefficients Rvu are dequantized by being multiplied by the corresponding quantization coefficients Qvu, included in the security mode quantization table Qsy, so that the quantized DCT coefficients Rvu are converted to dequantized DCT coefficients F'vu. The dequantized DCT coefficients F'vu correspond to the DCT coefficients Fvu shown in FIG. 3. The dequantized DCT coefficients F'vu are subjected to the two dimensional IDCT process, in the IDCT processing unit 24, and are converted to IDCT coefficients P'yx. Although the IDCT coefficients P'yx correspond to the pixel values Pyx shown in FIG. 3, the quantization coefficients corresponding to the AC components all have similar values. Namely, one block composed of 8×8 pixels is converted such that all the pixels have similar luminance values, and thus, mosaic patterns are reproduced for the whole of the image.

Figure 6:
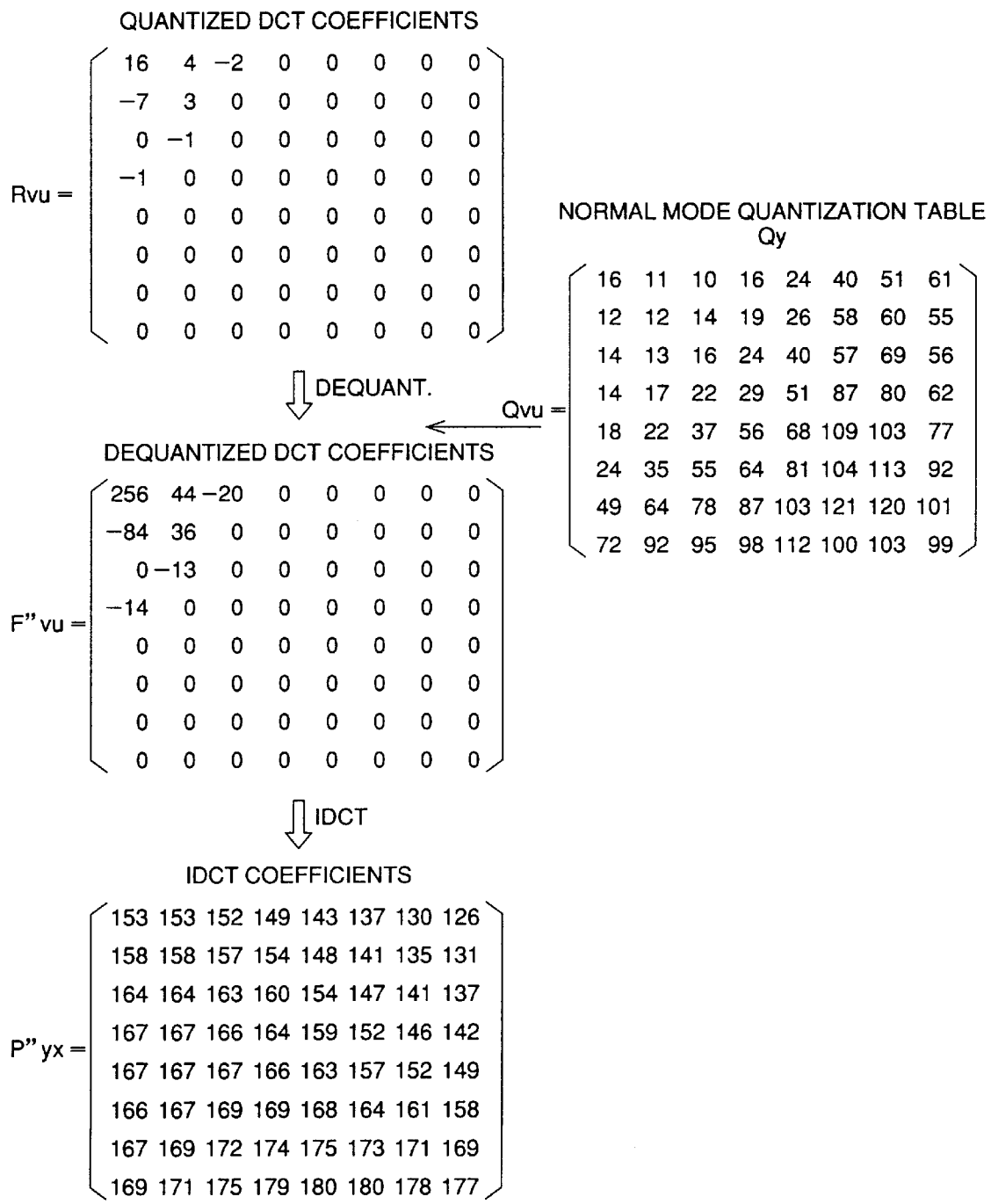
FIG. 6 is a view showing an example in which quantized DCT coefficients Rvu, obtained by the expansion processing unit, are dequantized using a normal mode quantization table, which is provided for cancelling the security mode.

FIG. 6 shows an example in which quantized DCT coefficients Rvu, obtained by the expansion processing unit 21, are dequantized using the normal mode quantization table Qy which is provided for cancelling the security mode. In comparison with a case in which the security mode quantization table Qsy is used, each value of the dequantized DCT coefficients F"vu and each value of the IDCT coefficients P"yx are different to those shown in the related parts of FIG. 5 and, as understood from comparison with the pixel values Pyx shown in FIG. 3, the IDCT coefficients P"yx are composed of pixel values which are substantially the same as those of the original image data.

Figure 7:
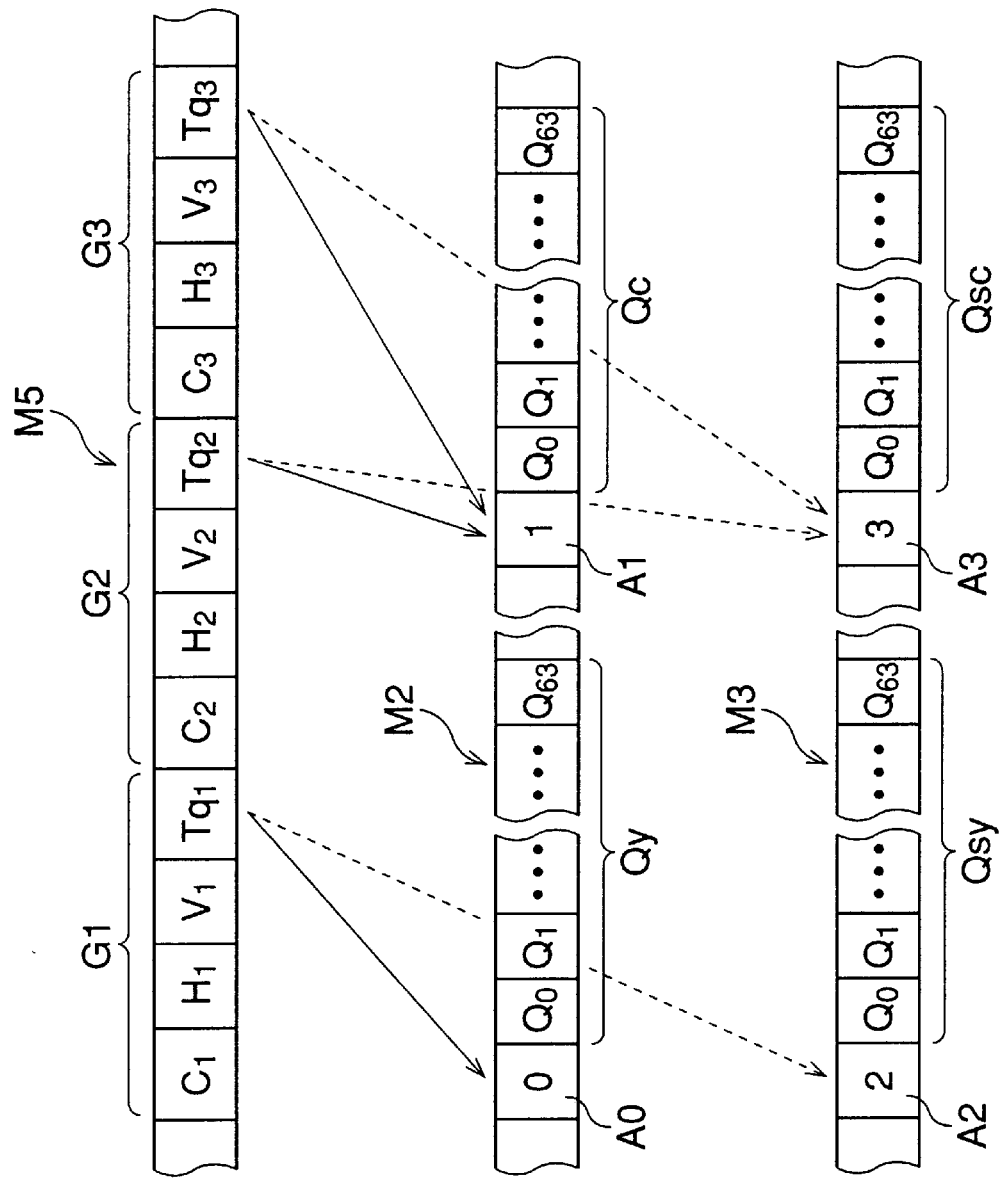
FIG. 7 is a view showing a construction of a first table recording area, a second table recording area and a parameter recording area provided in a recording medium.

FIG. 7 shows a construction of the first table recording area M2, the second table recording area M3 and a parameter recording area MS, provided in the recording medium M.

The parameter recording area M5 is composed of a first group G1, a second group G2 and a third group G3. Component recognition information $C_1$ means that a parameter regarding the luminance data Y is stored in the first group G1. $H_1$ represents a horizontal sampling factor and $V_1$ represents a vertical sampling factor. These sampling factors $H_1$ and $V_1$ are determined according to a recommendation by the JPEG. $Tq_1$ indicates quantization table selection information, the selection information being a value of a quantization table number which corresponds to the first table recording area M2 or the second table recording area M3, in which the quantization table regarding the luminance data Y is stored.

Similarly, component recognition information $C_2$ means that a parameter regarding the color difference data Cb is stored in the second group G2. $H_2$ represents a horizontal sampling factor and $V_2$ represents a vertical sampling factor. These sampling factors $H_2$ and $V_2$ are determined according to a recommendation by the JPEG. $Tq_2$ is quantization table selection information regarding the color difference data Cb. Component recognition information $C_3$ means that a parameter regarding the color difference data Cr is stored in the third group G3. $H_3$ represents a horizontal sampling factor and $V_3$ indicates a vertical sampling factor. These sampling factors $H_3$ and $V_3$ are determined according to a recommendation by the JPEG. $Tq_3$ is quantization table selection information regarding the color difference data Cr.

As described above, the first recording area M2 is provided for recording the security mode quantization tables Qsy and Qsc and the second recording area M3 is provided for recording the normal mode quantization tables Qy and Qc.

Regarding the security mode quantization tables Qsy and Qsc, a first quantization table number of "0" (reference is A0 in FIG. 7) is stored in an address of $Tq_1$ as first quantization table selection information, and 64 quantization coefficients $Q_0, Q_1, \ldots Q_{63}$ forming the quantization table Qsy, used for quantizing the luminance data Y, are stored in the addresses following the first quantization table number. Second quantization table numbers of "1" (reference is A1 in FIG. 7) are stored in addresses of $Tq_2$ and $Tq_3$ as second quantization table selection information, where $Tq_2$ and $Tq_3$ have identical addresses, and 64 quantization coefficients $Q_0, Q_1, \ldots Q_{63}$ forming the quantization table Qsc, used for quantizing the color difference data Cb and Cr, are stored in the addresses following the second quantization table numbers.

Regarding the normal mode quantization tables Qy and Qc for cancelling the security, a third quantization table number of "2" (reference is A2 in FIG. 7) is stored in an address of $Tq_1$ as third quantization table selection information, and 64 quantization coefficients $Q_0, Q_1, \ldots Q_{63}$ forming the quantization table Qy, used for quantizing the luminance data Y, are stored in the addresses following the third quantization table number. Fourth quantization table numbers of "3" (reference is A3 in FIG. 7) are stored in addresses of $Tq_2$ and $Tq_3$ as fourth quantization table selection information, where the addresses of $Tq_2$ and $Tq_3$ are identical, and 64 quantization coefficients $Q_0, Q_1, \ldots Q_{63}$ forming the quantization table Qc used for quantizing the color difference data Cb and Cr, are stored in the addresses following the fourth quantization table numbers.

Therefore, by setting each selection information ($Tq_1$, $Tq_2$ and $Tq_3$) to an integer value of one of 0 through 3, corresponding to the required quantization table and, thereby, to the operations of switches 25 and 26 shown in FIG. 4, the predetermined quantization tables Qy, Qc, Qsy and Qsc are selected.

Figure 8:
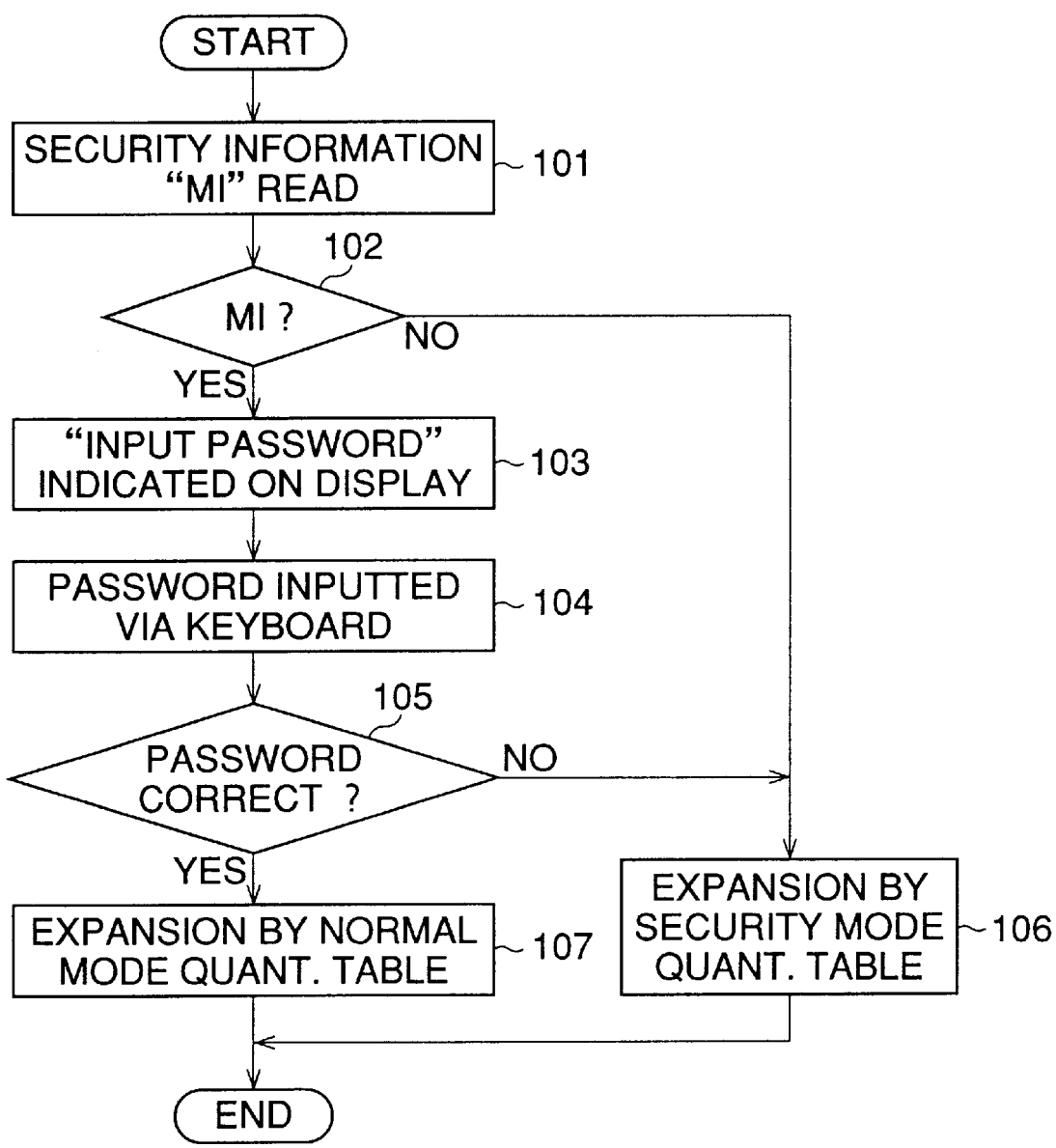
FIG. 8 is a flow chart showing an image expansion process.

FIG. 8 is a flow chart showing an image expansion process.

In Step 101, data stored in the information recording area M4 of the recording medium M are read out. In Step 102, it is determined based on the data whether security information MI is stored in the information recording area M4. When the security information MI is stored, Step 103 is executed so that a message, implying that a password should be inputted, is indicated by the display device 28.

In Step 104, the keyboard 29 is operated, so that a mode of the image expansion process is selected. When the password is correctly inputted through the keyboard 29, the process goes from Step 105 to Step 107, so that the expansion process is performed using the normal mode quantization tables Qy and Qc, and then, this image expansion process program ends. Conversely, when the password is not correctly inputted through the keyboard 29 and, also, when it is determined in Step 102 that the security information MI is not stored, Step 106 is executed so that the expansion process is performed using the security mode quantization tables Qsy and Qsc.

As described above, according to the embodiment, only when the password is inputted, for example, an image, which is as close to the original image as possible, can be reproduced based on the compressed image data recorded in the recording medium. Therefore, the secrecy of the original image can be maintained. Namely, a compressed image, subjected to a compression process according to the embodiment, cannot be reproduced to a faithful original image, using a conventional image expansion device.

Note that, the security of the original image is not necessarily only attained by the mosaic-process, but by a process by which an image having a lower quality than the original image is reproduced.

Further note that, as a method of image compression, an image compression other than the JPEG algorithm can be applied.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 8-247255 (filed on Aug. 29, 1996) which is expressly incorporated herein by reference, in its entirety.

What is claimed is:

1. An image compression device, by which compressed image data is recorded in a recording medium, having a compressed image data recording area, in which said compressed image data is stored, and a first table recording area, which is accessed in a usual expansion process, a second table recording area which is not accessed in the usual expansion process, and an information recording area, in which security information is recorded, said image compression device comprising:

a two-dimensional discrete cosine transformation (two-dimensional DCT) processor that processes original image data to obtain a DCT coefficient for each spatial frequency;

a quantization processor that quantizes said DCT coefficient for each spatial frequency by a normal mode quantization table, which is used in said usual expansion process, to obtain quantized DCT coefficients;

an encoding processor that encodes said quantized DCT coefficients to obtain compressed image data;

a compressed image recording processor that records said compressed image data in said compressed image data recording area;

a first table recording processor that records a security mode quantization table, which is different from the normal mode quantization table and is used when dequantizing the quantized DCT coefficients in a security mode for reproducing an image having a lower quality than an original image, in said first table recording area; and a second table recording processor that records said normal mode quantization table in a second table recording area.

2. A device according to claim 1, further comprising:

an information recording processor recording security information, implying that said security mode quantization table is recorded in said first table recording area and said normal mode quantization table is recorded in said second table recording, in said information recording area.

3. A device according to claim 1, wherein said original image data corresponds to a still image.

4. A device according to claim 1, wherein said security mode quantization table comprises quantization coefficients used during dequantization of the quantized DCT coefficients for expanding said compressed image data as a mosaic-processed image.

5. An image expansion device that reads compressed image data, which has been obtained using a normal mode quantization table during a quantization process, from a recording medium and expands said compressed image data, said recording medium having a first table recording area storing a security mode quantization table, which is not used in the quantization process and is used in a security mode for reproducing an image having a lower quality than the original image, a second table recording area storing the normal mode quantization table used in a usual expansion process, and an information recording area storing security information, said image expansion device comprising:

a decoding processor that decodes said compressed image data to obtain quantized DCT coefficients;

a table selecting processor that selects said security mode quantization table from said security mode quantization table and said normal mode quantization table, if a password corresponding to said security information is not inputted to said device;

a dequantization processor that dequantizes said quantized DCT coefficients, using said security mode quantization selected by said table selecting processor, to obtain DCT coefficients; and a two dimensional inverse discrete cosine transformation (two-dimensional IDCT) processor that processes said DCT coefficients to reproduce original image data corresponding to said compressed image data.

6. A device according to claim 5, wherein said table selecting processor selects said normal mode quantization table when said password is inputted to said device.

7. A device according to claim 5, wherein said original image data corresponds to a still image.

8. A device according to claim 5, wherein said security mode quantization table comprises quantization coefficients used during dequantization of the quantized DCT coefficients for expanding said compressed image data as a mosaic-processed image.

9. A device according to claim 5, further comprising an indicating processor that indicates that said normal mode quantization table can be selected.

10. An image compression and expansion device, comprising:

a two dimensional discrete cosine transformation (two-dimensional DCT) processor that processes original image data to obtain a DCT coefficient for each spatial frequency;

a quantization processor that quantizes said DCT coefficient for each spatial frequency by a normal mode quantization table used in a usual expansion process, to obtain quantized DCT coefficients;

an encoding processor that encodes said quantized DCT coefficients to obtain compressed image data;

a compressed image recording processor that records said compressed image data in a compressed image data recording area of a recording medium;

a first table recording processor that records a security mode quantization table, which is different from the normal mode quantization table and is used when dequantizing the quantized DCT coefficients in a security mode for reproducing an image having a lower quality than an original image, in a first table recording area of said recording medium;

a second table recording processor that records said normal mode quantization table in a second table recording are of said recording medium;

an information recording processor that records security information implying that said security mode quantization table is recorded in said first recording area and said normal mode quantization table is recorded in said second recording area;

a decoding processor that decodes said compressed image data to reproduce said quantized DCT coefficients from said compressed image;

a table selecting processor that selects one of said security mode and said normal mode quantization tables in accordance with said security information;

a dequantization processor that dequantizes said quantized DCT coefficients, using said security mode quantization table when the security mode quantization table is selected by said table selecting processor, to reproduce second DCT coefficients, which are different from the DCT coefficients; and a two dimensional inverse discrete cosine transform (two-dimensional IDCT) processor that processes said second DCT coefficients to reproduce image data that corresponds to said compressed image data and are to reproduce an image having a lower quality than the original image, when the security mode quantization table is selected by said table selecting processor.

11. An image compression device, by which compressed image data is recorded in a recording medium, having a compressed image data recording area, in which said compressed image data is stored, and a first table recording area, which is accessed in a usual expansion process, said image compression devise comprising:

a two-dimentional discrete cosine transformation (two-dementional DCT) processor that processes original image data to obtain a DCT coefficient for each spatial frequency;

a quantization processor that quantizes said DCT coefficient for each spatial frequency by a normal mode quantization table, which is used in said usual expansion process, to obtain quantized DCT coefficients;

an encoding processor that encodes said quantized DCT coefficients to obtain compressed image data;

a compressed image recording processor that records said compressed image data in said compressed image data recording area; and a first table recording processor that records an expansion operation quantization table, which is different from the normal mode quantization table used by the quantization processor and is used only during dequantization of the quantized DCT for reproducing an image from said compressed image data, in said first table recording area.

12. The image compression device according to claim 11, further comprising:

said expansion operation quantization table being used in a security mode in which an image having a lower quality than an original image is reproduced.

* * * * *